US008731191B2

(12) United States Patent
Wu et al.

(10) Patent No.: US 8,731,191 B2
(45) Date of Patent: May 20, 2014

(54) DATA ENCRYPTION METHOD AND SYSTEM AND DATA DECRYPTION METHOD

(75) Inventors: Guanghui Wu, Shanghai (CN); Shoudi Li, Shanghai (CN); Xue Cui, Shanghai (CN)

(73) Assignee: VIA Technologies, Inc., New Taipei (TW)

( * ) Notice: Subject to any disclaimer, the term of this patent is extended or adjusted under 35 U.S.C. 154(b) by 26 days.

(21) Appl. No.: 13/303,794

(22) Filed: Nov. 23, 2011

(65) Prior Publication Data

US 2012/0250859 A1  Oct. 4, 2012

(30) Foreign Application Priority Data

Mar. 28, 2011 (CN) .......................... 2011 1 0074937

(51) Int. Cl.
*H04L 9/14* (2006.01)
*G06F 21/12* (2013.01)

(52) U.S. Cl.
CPC ....... *G06F 21/125* (2013.01); *Y10S 707/99939* (2013.01)
USPC ............... 380/44; 380/30; 380/255; 380/279; 380/277; 713/151; 713/167; 713/189; 713/188; 726/22; 726/23; 726/24; 726/25; 726/26; 717/100; 717/122; 717/127; 358/3.28; 707/999.009

(58) Field of Classification Search
CPC ... G06F 21/125; G06F 21/73; G06F 21/6209; H04L 9/0861
See application file for complete search history.

(56) References Cited

U.S. PATENT DOCUMENTS

| | | | | |
|---|---|---|---|---|
| 5,870,477 A * | 2/1999 | Sasaki et al. | .................. | 713/165 |
| 7,124,302 B2 * | 10/2006 | Ginter et al. | .................. | 713/189 |
| 7,664,967 B2 * | 2/2010 | Thorpe | .......................... | 713/193 |
| 7,770,016 B2 * | 8/2010 | Horne et al. | .................. | 713/176 |
| 2002/0101995 A1 * | 8/2002 | Hashimoto et al. | ........... | 380/277 |
| 2005/0165698 A1 * | 7/2005 | Cho et al. | ......................... | 705/67 |
| 2006/0136875 A1 * | 6/2006 | Thorpe | .......................... | 717/122 |
| 2007/0183194 A1 * | 8/2007 | Devadas et al. | .......... | 365/185.03 |
| 2008/0235518 A1 * | 9/2008 | Chen et al. | ..................... | 713/189 |
| 2009/0262936 A1 * | 10/2009 | Cho et al. | ....................... | 380/255 |
| 2010/0229002 A1 * | 9/2010 | Horne et al. | .................. | 713/190 |
| 2010/0268958 A1 * | 10/2010 | Horne et al. | .................. | 713/176 |
| 2011/0055585 A1 * | 3/2011 | Lee | ............................. | 713/183 |
| 2011/0185181 A1 * | 7/2011 | Lin | .............................. | 713/176 |

OTHER PUBLICATIONS

Yahya Al-Nabhani et al., A New System for Hidden Data within Header Space for EXE-File Using Object Oriented Technique, 3d International Conference on Computer Science and Information Technology 9-13 (ICCSIT) (2010)), as applied to claim 1, further in view of Hexplorer (Hexplorer 2.6, Softpedia, 2009 (Wayback machine dated 2009.*
Md. Rafiqul Islam et al., New System for Secure Cover File of Hidden Data in the Image Page within Executable File Using Statistical Steganography Techniques, 7 International Journal of Computer Science and Information Security 274-279 (2009).*
Hexplorer 2.6, Softpedia, 2009 (Wayback machine dated 2009) (http://softpedia.com/get/Programming/File-Editors/Hexplorer.shtml).*

* cited by examiner

*Primary Examiner* — Morshed Mehedi
*Assistant Examiner* — Sharon Lynch
(74) *Attorney, Agent, or Firm* — McClure, Qualey & Rodack, LLP

(57) ABSTRACT

An embodiment of the invention provides a data encryption method for an electrical device. The method comprises: generating an identification code corresponding to the electrical device; generating a temporary key according to the identification code; encrypting first data to generate a first secret key according to the temporary key and a first encryption mechanism; and encrypting the first secret key by a second encryption mechanism to generate an encrypted key.

18 Claims, 3 Drawing Sheets

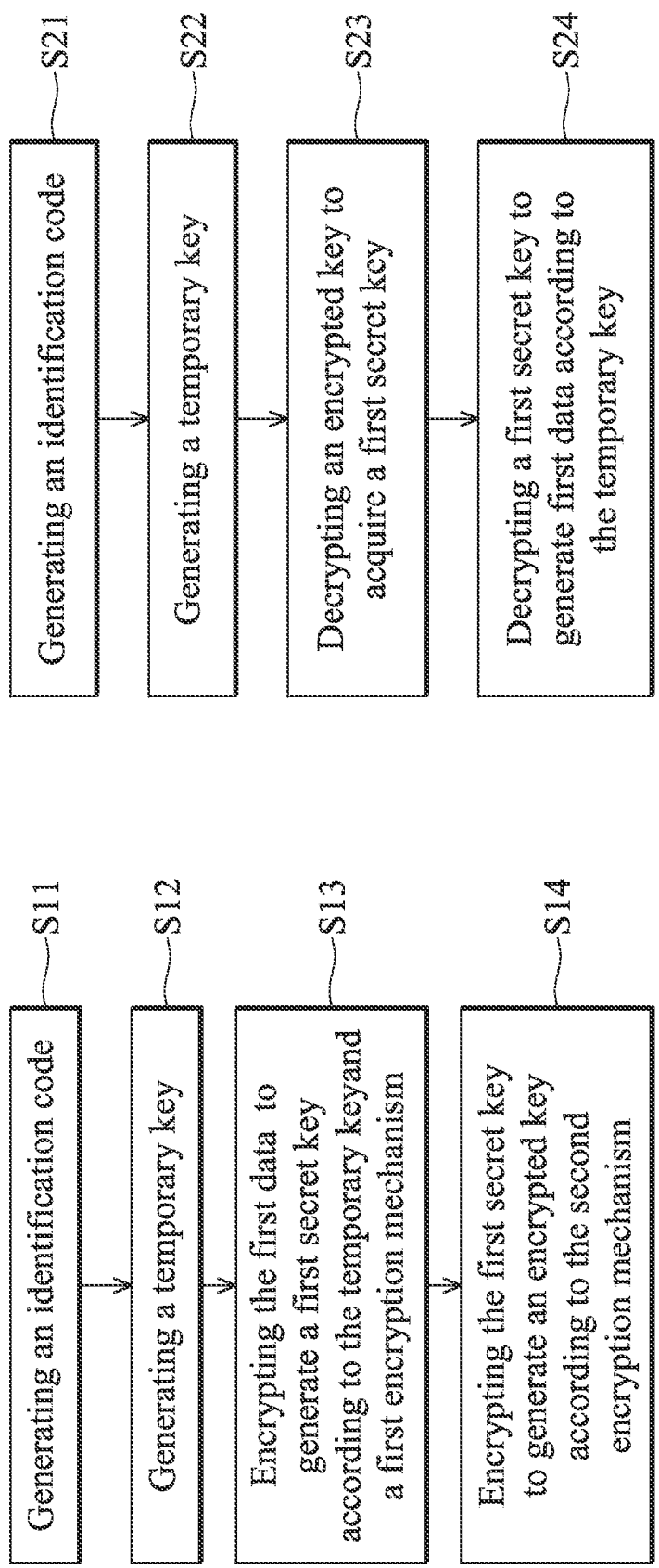

DATA ENCRYPTION METHOD AND SYSTEM AND DATA DECRYPTION METHOD

CROSS REFERENCE TO RELATED APPLICATIONS

This Application claims priority of China Patent Application No. 201110074937.X, filed on Mar. 28, 2011, the entirety of which is incorporated by reference herein.

BACKGROUND OF THE INVENTION

1. Field of the Invention

The present invention relates to a data encryption method and in particular relates to a data encryption method between an electronic device and an external storage device.

2. Description of the Related Art

With the popularization of computers, more and more users store personal data in computers. If the data stored in the computer is not protected by some protection mechanism, the data may be stolen. Also, as users more commonly use internet applications, it is easier for hackers to steal data from a computer via internet connection. Therefore, data protection of data stored on computers is an important issue.

Generally speaking, users can encrypt data by some encryption technology. If the encrypted data is stolen, the encrypted data cannot be correctly decrypted without correct password, and a hacker or thief may be unable to access the correct content of the encrypted data. Most types of encryption technologies ask a user to input a password and encrypt data according to the password. When a user wants to decrypt the encrypted data, he/she only has to input the password to acquire the original data. However, if the user forgets their password, the encrypted data will not be decrypted correctly, which causes an inconvenience for the user. Another type of encryption mechanism is to use a key to encrypt the data. However, if the key is not well kept and stolen by a hacker, the hacker may decrypt the encrypted data using the stolen key. Thus, the encryption mechanism is still not foolproof.

BRIEF SUMMARY OF THE INVENTION

An embodiment of the invention provides a data encryption method for an electrical device. The method comprises: generating an identification code corresponding to the electrical device; generating a temporary key according to the identification code; encrypting first data to generate a first secret key according to the temporary key by following a first encryption mechanism; and encrypting the first secret key by using a second encryption mechanism to generate an encrypted key.

Another embodiment of the invention provides a data encryption system comprising an electronic device and a data encryption module. The data encryption module comprises an identification code generation device, a temporary key generation unit, a first encryption unit and a second encryption unit. The identification code generation device generates an identification code corresponding to the electronic device. The temporary key generation unit generates a temporary key according to the identification code. The first encryption unit encrypts first data to generate a first secret key according to the temporary key. The second encryption unit encrypts the first secret key to generate an encrypted key.

Another embodiment of the invention provides a data decryption method for an electronic device. The method comprises: generating an identification code corresponding to the electrical device; generating a temporary key according to the identification code; decrypting an encrypted key to acquire a first secret key according to a second encryption mechanism; and decrypting the first secret key to generate first data according to a first encryption mechanism.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 1 is a flowchart of a data encryption method according to an embodiment of the invention.

FIG. 2 is a flowchart of a data decryption method according to an embodiment of the invention.

DETAILED DESCRIPTION OF THE INVENTION

Figure 3:
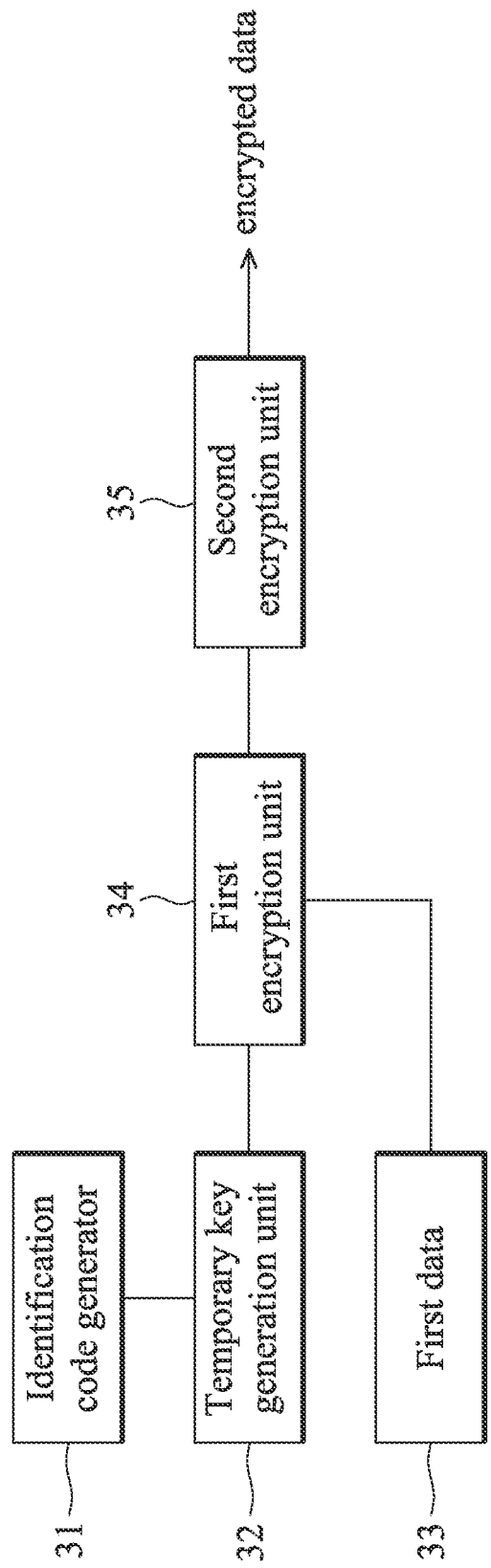
FIG. 3 is a data encryption device according to an embodiment of the invention.

The following description is of the best-contemplated mode of carrying out the invention. This description is made for the purpose of illustrating the general principles of the invention and should not be taken in a limiting sense. The scope of the invention is best determined by reference to the appended claims.

FIG. 1 is a flowchart of a data encryption method according to an embodiment of the invention. The data encryption method of this embodiment is executed by an electronic device, such as mobile phone, PDA, game console or other electronic device, to prevent data, software or application programs of the electronic device from being stolen. In an embodiment, an encrypted key generated by the data encryption method can be used as authorization data and the electronic device can verify an external device according to the authorization data. The external device may be an external hard disk, a USB device, a flash memory storage device, a device storing an application program or a device storing game software.

In step S11, an identification code is generated. In this step, the identification code can be generated according to a processor identification code of a processor of the electronic device, an identification code of the external device, a customer identification code, or other kinds of identification codes or combinations thereof. The customer identification code is provided by software of the external storage device or the vendor of the game software.

In step S12, a temporary key is generated according to the identification code. The temporary key may be generated by a key generator or key generation program.

In step S13, a first secret key is generated by encrypted first data according to the temporary key and a first encryption mechanism, wherein the first encryption mechanism may be implemented by encryption software or encryption hardware. In this embodiment, the first data is a data encryption key and the electronic device can use the data encryption key to encrypt the target data, software or application program, wherein the data encryption key may be generated by a random generator. In other embodiments, the first data may be any kind of data, software, files or application programs which have to be protected.

In step S14, an encrypted key is generated by encrypting the first secret key according to the second encryption mechanism. In this embodiment, the second encryption mechanism is implemented by a substitution box. In this embodiment, the data of the substitution box can be hidden and stored in the code segment and is not stored in the data segment. For example, the hexadecimal data of the substitution box can be transformed into binary data and the binary data can be hidden in the code segment of a portable executable file, such as the code segment of a dynamic link library. Thus, a hacker cannot directly acquire the data of the substitution box and even if the hacker acquires the encrypted key, the hacker cannot decrypt the encrypted key without the help of the necessary data stored in the substitute box. In this embodiment, if the first data is provided by an external device, the electronic device deletes the first data of the external device and stores the encrypted key into the external device so as to protect it from being stolen by any unauthorized user.

FIG. 2 is a flowchart of a data decryption method according to an embodiment of the invention. In FIG. 1, the encrypted key is stored in the external storage device. When the electronic device connects to the external storage device again, the electronic device decrypts the encrypted key to obtain the encrypted data and the electronic device can verify and authorize the external storage device according to the encrypted data. Although the embodiment is illustrated with the described application, the invention is not limited thereto.

In step S21, the electronic device first generates an identification code. In this embodiment, the identification code can be generated according to a processor identification code of a processor of the electronic device, an identification code of the external device, a custom code or other kinds of identification code.

In step S22, the electronic device generates a temporary key according to the identification code. The temporary key may be generated by key generation software.

In the step S23, the electronic device obtains the encrypted key stored in the external device and decrypts the encrypted key to acquire a first secret key according to a second decryption mechanism. In this embodiment, the second decryption mechanism is implemented by an inverse substitution box. In this embodiment, the data of the inverse substitution box can be stored in the code segment rather than the data segment. For example, the hexadecimal data of the substitution box can be transformed into binary data and the binary data can be hidden in the code segment of the executable file, such as the code segment of dynamic linkable library. Even if a hacker acquires the encrypted key, the hacker cannot decrypt the encrypted key without the help of the necessary data stored in the substitute box.

In the step S24, first data is generated by decrypting a first secret key according to the temporary key and a first decryption mechanism. In this embodiment, the first data is a data encrypted key and the electronic device uses the data encrypted key to decrypt the encrypted data, software or application program. In other embodiments, the first data may be a file, software or application program.

FIG. 3 is a data encryption device according to an embodiment of the invention. The data encryption device can be embedded in an electronic device or an external device of the electronic device, and the electronic device further connects to an external device, such as memory card or flash storage device.

The identification code generator 31 generates an identification code according to a processor identification code of a processor of the electronic device and a first identification code of the external storage device. In another embodiment, if the external storage device stores software or game software, the identification code generator 31 generates the identification code according to software identification code of the software of the game software, the processor identification code of a processor of the electronic device and a first identification code of the external storage device. In another embodiment, the identification code is the first identification code of the external storage device. Furthermore, the external storage device can store a customer identification code of the vendor or the manufacturer of the external storage device, the software or the game software. The identification code generator 31 generates the identification code according to the customer identification code, a first identification code and the processor identification code.

The temporary key generation unit 32 generates a temporary key according to the identification code.

The first data 33 is a data encrypted key stored in the external storage device or the electronic device. The electronic device encrypts the data, software or application program according to the data encrypted key, wherein the data encrypted key is generated by a random generator. In other embodiments, the first data 33 is the data, software or application program, which has to be encrypted, stored in the external storage device or the electronic device.

The first encryption unit 34 uses the temporary key to encrypt the first data to generate a first secret key.

The second encryption unit 35 encrypts the first secret key to generate an encrypted key. In this embodiment, the second encryption unit 35 uses a substitute box to encrypt the first secret key to generate the encrypted key. In this embodiment, the data of the substitute box can be hidden in the code segment of a file rather than stored in the data segment. For example, the hexadecimal data of the substitution box can be transformed into binary data and the binary data can be hidden in the code segment of the executable file, such as the code segment of a dynamic linkable library. Since a hacker cannot acquire the data stored in the substitute box, even if the hacker acquires the encrypted key, the hacker cannot use the encrypted key to decrypt data without the necessary data stored in the substitute box.

Figure 4:
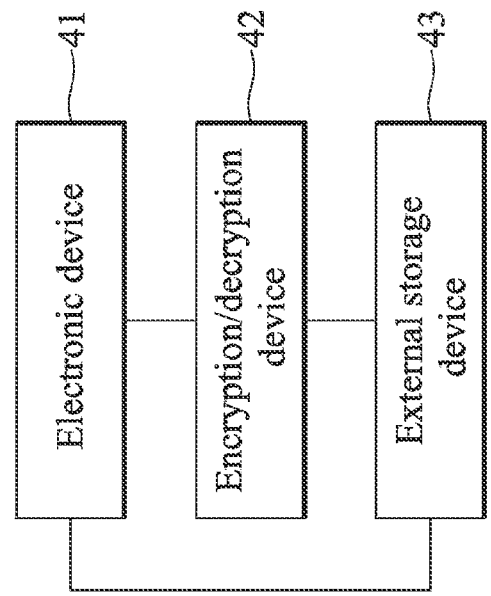
FIG. 4 is a schematic diagram of a data encryption and verification system according to an embodiment of the invention.

FIG. 4 is a schematic diagram of a data encryption and verification system according to an embodiment of the invention. When an external storage device 43 first electrically connects to the electronic device 41, the electronic device 41 first generates an identification code according to the external storage device 43 and the electronic device 41 and acquires first data of the external storage device 43. Then, the electronic device 41 executes an encryption program of the encryption/decryption device 42 to encrypt the first data so as to generate an encrypted key. Reference can be made to the flowchart of FIG. 1 for a detailed description of the encryption steps. Then, the electronic device deletes the first data 33 and stores the encrypted key to the external storage device 43.

When the external storage device 43 connects to the electronic device 41 again, the electronic device 31 acquires the encrypted key stored in the external storage device 43 and decrypts the encrypted key by executing a decryption program of the encryption/decryption device 42 to generate the first data. Reference can be made to the flowchart of FIG. 2 for the detailed description of the decryption operation. Then, the electronic device can use the first data to perform a decryption procedure or to verify and/or authorize the external storage device 43 or software stored in the external storage device 43.

Figure 5:
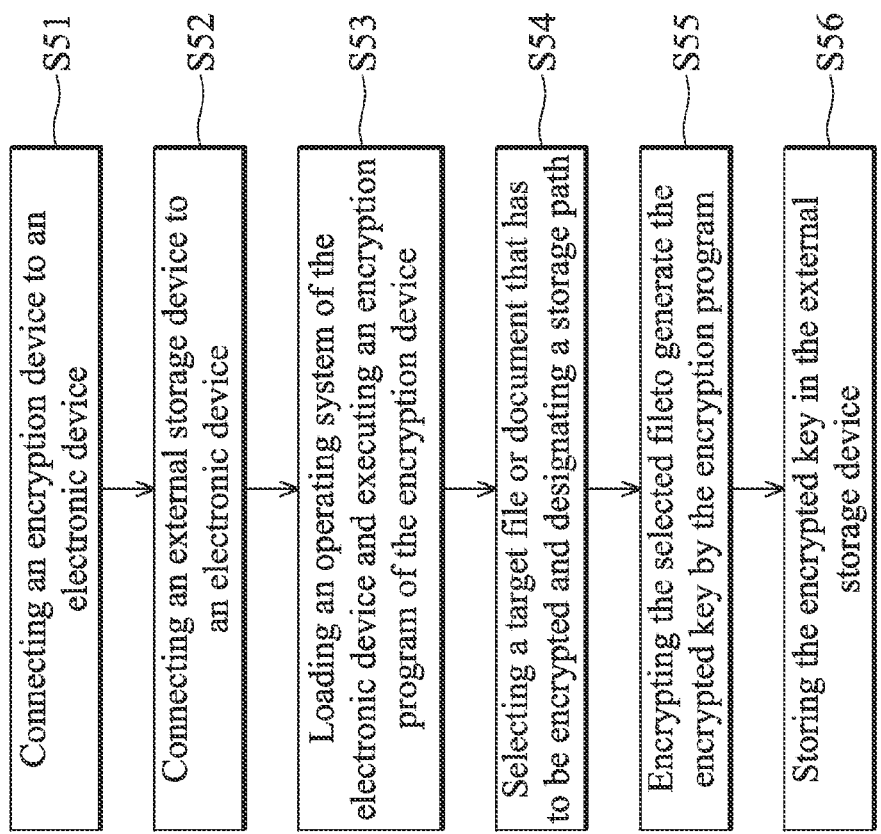
FIG. 5 is a flowchart showing the steps, wherein an electronic device encrypts data of an external storage device according to an embodiment of the invention.

FIG. 5 is a flowchart showing the steps, wherein an electronic device encrypts data of an external storage device according to an embodiment of the invention. In step S51, the electronic device connects to an encryption device, wherein the encryption device stores an encryption program. In step S52, the electronic device connects to an external storage device, wherein the external storage device may be a memory card, a portable external hard drive or other storage device. In step S53, an operating system of the electronic device executes the encryption program of the encryption device. In step S54, a user can select and encrypt first data of the external storage device via the electronic device, and the user can set a storage path or folder for an encrypted key generated by the encryption program. In the step S55, the encryption program encrypts the selected data to generate the encrypted key. Reference can be mad to the flowchart of FIG. 1 for a detailed description of the encryption procedure. In step S56, the encrypted key is stored in the external storage device and thereafter, the electronic device deletes the first data in the external device.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data encryption method for an electrical device, comprising:
    generating an identification code corresponding to the electrical device;
    generating a temporary key according to the identification code;
    encrypting first data to generate a first secret key according to the temporary key and a first encryption mechanism; and encrypting the first secret key by a second encryption mechanism to generate an encrypted key;
    wherein the second encryption mechanism is implemented by a substitution box and the data of the substitution box is hidden in a code segment of an executable file by a hiding mechanism; and
    wherein the hiding mechanism executes the steps of:
        re-coding hexadecimal data of the substitution box to generate binary data; and
        hiding the binary data in the code segment of the executable file, wherein the executable file comprises the code segment and a data segment, and the data of the substitution box is hidden and stored in the code segment and is not stored in the data segment.

2. The method as claimed in claim 1, further comprising:
    connecting an external storage device to the electrical device;
    acquiring a first identification code of the external storage device; and
    generating the identification code according to the first identification code.

3. The method as claimed in claim 2, wherein the first identification code is provided by software of the external storage device.

4. The method as claimed in claim 2, further comprising:
    acquiring a second identification code; and
    generating the identification code according to the first identification code and the second identification code.

5. The method as claimed in claim 4, wherein the second identification code is a processor identification code of a processor of the electrical device.

6. The method as claimed in claim 4, further comprising:
    acquiring a customer identification code from the external storage device and generating the identification code according to the first identification code, the second identification code and the customer identification code.

7. The method as claimed in claim 2, wherein the first data is stored in the external storage device, and after the encrypted key is generated and stored in the external storage device, the first data is deleted from the external storage device.

8. The method as claimed in claim 1, wherein the first data is a data encryption key and the electronic device encrypts data according to the data encryption key.

9. The method as claimed in claim 1, wherein the binary data is hidden in the code segment of the dynamic link library.

10. A data system, comprising:
    an electronic device; and
    a data encryption module, comprising:
        an identification code generation device to generate an identification code corresponding to the electrical device;
        a temporary key generation unit to generate a temporary key according to the identification code;
        a first encryption unit to encrypt first data to generate a first secret key according to the temporary key; and
        a second encryption unit to encrypt the first secret key to generate an encrypted key;
    wherein the second encryption unit uses a substitution box to encrypt the first secret key, and the data of the substitution box is hidden in a code segment of an executable file by a hiding mechanism; and
    wherein the hiding mechanism executes the steps of:
        re-coding hexadecimal data of the substitution box to generate binary data; and
        hiding the binary data in the code segment of the executable file, wherein the executable file comprises the code segment and a data segment, and the data of the substitution box is hidden and stored in the code segment and is not stored in the data segment.

11. The system as claimed in claim 10, wherein the first data is a data encryption key and the electronic device encrypts data according to the data encryption key.

12. The system as claimed in claim 10, wherein the electronic device is connected to an external storage device, the external storage device has a first identification code, the electronic device has a second identification code, and the identification code generation device generates the identification code according to the first identification code and the second identification code.

13. The system as claimed in claim 12, wherein the first identification code is provided by software of the external storage device and the second identification code is a processor identification code of a processor of the electronic device.

14. The system as claimed in claim 12, wherein the external storage device further stores a customer identification code, and the identification code is generated according to the first identification code, the second identification code and the customer identification code.

15. The system as claimed in claim 12, wherein after the encrypted key is generated and stored in the external storage device, the first data is deleted from the external storage device.

16. The system as claimed in claim 10, wherein the binary data is hidden in the code segment of the dynamic link library.

17. A data decryption method for an electronic device, comprising:
- generating an identification code corresponding to the electrical device;
- generating a temporary key according to the identification code;
- decrypting an encrypted key to acquire a first secret key according to a second encryption mechanism, wherein the second encryption mechanism is implemented by a substitution box and the data of the substitution box is hidden in a code segment of an executable file by a hiding mechanism; and
- decrypting the first secret key to generate first data according to a first encryption mechanism;
- wherein the hiding mechanism executes the steps of:
  - re-coding hexadecimal data of the substitution box to generate binary data; and
  - hiding the binary data in the code segment of the executable file, wherein the executable file comprises the code segment and a data segment, and the data of the substitution box is hidden and stored in the code segment and is not stored in the data segment.

18. The method as claimed in claim 17, wherein the binary data is hidden in the code segment of the dynamic link library.

* * * * *